Jan. 27, 1970  F. R. BIRDSALL  3,491,866

ELECTROMAGNETIC CLUTCH

Filed Feb. 27, 1968

WITNESS:
Esther M. Stockton

INVENTOR.
Fred R. Birdsall
BY
W. S. Thompson
ATTORNEY

United States Patent Office 3,491,866
Patented Jan. 27, 1970

3,491,866
ELECTROMAGNETIC CLUTCH
Fred R. Birdsall, Sayre, Pa., assignor to The Bendix Corporation, a corporation of Delaware
Filed Feb. 27, 1968, Ser. No. 708,599
Int. Cl. F16d 27/02, 37/02
U.S. Cl. 192—84          6 Claims

ABSTRACT OF THE DISCLOSURE

An electromagnetic clutch having circumferentially-spaced, radially-movable armature segments which move to effect a driving relation between inner and outer rotating members. The segments are retained by spring clips in one of the rotatable members, either the driving or driven member, and are drawn into torque-transmitting contact with the other of the rotating members by an electromagnetic coil.

---

This invention relates to electromagnetic clutches and, particularly, to those in which an electromagnetic coil draws one or more armature members across an air gap to produce a driving relationship between the torque transmitting members. The prior art shows various configurations of electromagnetic friction clutches, but they employ an axial movement of the armatures and, therefore, have a reduced friction radius and limited torque-transmitting capabilities.

It is an object of this invention to provide an electromagnetic clutch having a large friction radius. It is also an object of this invention to provide an electromagnetic clutch having a large friction radius which can also operate as an overspeed release clutch. It is a further object of this invention to provide such a clutch in which the electromagnetic coil may be either rotary or stationary. It is a still further object of this invention to provide an electromagnetic clutch having radially-movable armature segments.

Other and further objects and advantages of this invention will become apparent to the man skilled in the art from the following description and claims and from the appended drawings wherein:

Figure 1:
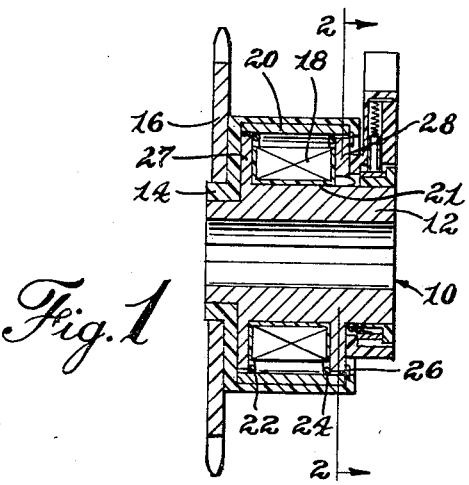
FIGURE 1 shows the preferred embodiment of an electromagnetic clutch, in section, according to the present invention, having a rotating electromagnetic coil.

Referring now to FIGURE 1, an electromagnetic clutch, designated generally as 10, is shown having a hub 12 which is keyed for attachment to a shaft or which may be attached in any conventional manner. The hub 12 supports a housing 14 which may be made of any non-flux conducting bearing material such as bronze or plastic and which, in turn, supports a sprocket 16. The sprocket 16 and housing 14 are rotationally stationary relative to each other and constitute one of the two rotary torque transmitting clutch members. The hub 12 includes a U-shaped cavity 21 for the electromagnetic coil 18 and constitutes the second of the torque transmitting clutch members. The U-shaped cavity 21 is defined by the hub 12 and its disc portions 27, 28 adapted at their circumference for engagement with the armature segments 20.

The driving connection between the hub 12 and the housing 14 is accomplished by the armature segments 20 which are yieldably retained within the housing 14 by springs 22 and 24 such that a slight air gap 26 exists between the armature segments 20 and the top of the disc portions 27, 28. The armature segments 20 are of a magnetically-permeable material and provide a flux path across the top of the U-shaped cavity. When current is flowing in the electromagnetic coil 18, the flux path is through the U-shaped portion of the hub 12 and through the armature segments 20, crossing both air gaps. These are, of course, of high reluctance and the flux attempts to reduce this by drawing the armature segments 20 toward the U-shape. When contact is made, the driving relationship is established and the air gaps, of course, are eliminated. Assuming an increase in rotational velocity, the armature segments 20 will, at some point, due to centrifugal forces, separate from the hub 12, thus breaking the driving connection. This point can be predetermined and the mass of the armature segments can be varied to provide for this separation as an overspeed control function. Current may, of course, be conducted to the coil by any conventional means such as by brushes or bearing conductors, such as at 28 in FIGURE 1, if the coil is rotary or by straight leads, such as at 128 in FIGURE 3, if the coil is stationary.

Figure 2:
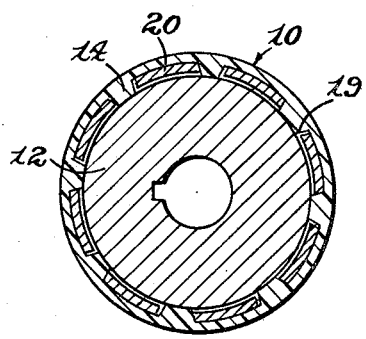
FIGURE 2 shows the electromagnetic clutch of FIGURE 1, along the line 2—2, in full section.

FIGURE 2 shows the relationship between the armature segments 20 and the housing 14 with each armature segment shown in its own recessed slot 19 in the housing 14. By making the armature segments large with respect to the spacing between them, the amount of flux passing through each and the torque transmitting surface of each is greatly increased to the end that the torque transmitting characteristics of the clutch are improved.

Figure 3:
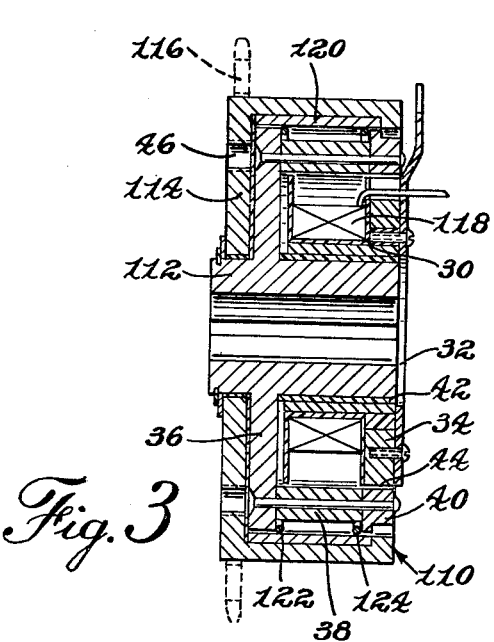
FIGURE 3 shows an electromagnetic clutch, in partial section, according to the present invention, having a stationary electromagnetic coil.

FIGURE 3 shows the present invention as it would apply to a stationary coil electromagnetic clutch. For convenience, those parts which are functionally the same as those in FIGURES 1 and 2 bear the same number in the one hundred series of numbering. The electromagnetic clutch 110 has a hub 112 mounted on a shaft, not shown, for rotation therewith. The electromagnetic coil 118 is retained in a separate, non-magnetic holder or bobbin 30 which is attached by bolts or other conventional means to mounting bracket 32 for stationary attachment to a frame or the like. A permeable ring element 34 is also mounted on the bracket 32 and is included as a portion of the flux path. The hub 112 has one radially-extending, disc-like portion 36 to which is attached a cylindrical, non-magnetic sleeve 38. At the end, opposite the disc is a permeable ring element 40. The hub and sleeve are free to rotate without interference from the electromagnetic coil, bobbin or mounting assembly. The armature segments 120 and housing 114 are virtually the same as before as are the springs 122 and 124.

In this configuration, the flux path includes the hub 112, disc 36, armature segments 120 and also includes the two ring elements 34 and 40. This configuration has additional high reluctance gaps for the bearing 42 and the air gap or bearing 44 which are not present in the rotary coil embodiment and, for this reason, has lower torque transmitting capabilities. Housing 114 may include a sprocket 116, as shown by dashed lines, or attachment bolt holes 46 for transmitting torque.

Figure 4:
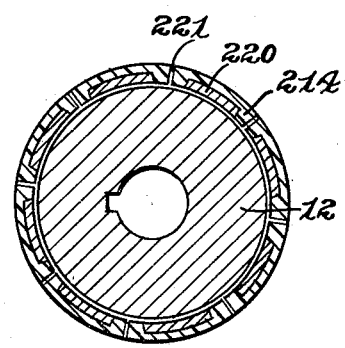
FIGURE 4 shows an alternative arrangement to that shown in FIGURE 2.

FIGURE 4 shows an arrangement similar to that shown in FIGURE 2, except that the armature segments 220 are rigidly retained in the housing 214. The housing is shown including notches 221 separating each armature. Providing the housing is made of a flexible material, such as a plastic, these notches 221 will allow the armatures 220 and housing 214 to flex to provide the movement necessary to form the driving connection between the torque transmitting members. This would then allow springs 22 and 24, as shown in FIGURES 1 and 3, to be eliminated.

I claim:
1. An electromagnetic clutch comprising:
first and second co-axial torque transmitting members;
said first member having a generally-cylindrical surface and including a plurality of circumferentially-spaced, axially extending, electromagnetic flux conducting armature segments;
said armature segments arranged to be electromagnetically insulated from each other and adapted to execute limited radial movement toward said second member;
said second member having a plurality of radially extending electromagnetic flux conducting disk portions adapted at their circumference for engagement with said armature segments whereby said armature segments provide a flux conducting path between adjacent disk portions;
resilient means operative to bias said armature segments away from said second member; and
means for generating an electromagnetic flux within said second member whereby said flux is substantially uniformly distributed about the circumference of said disk portions.

2. The device claimed in claim 1 wherein said armature segments are fixedly received in slotted portions of said first torque transmitting member and said slotted portions of said first torque transmitting member are separated from each other by notches in said first torque transmitting member between said slots and limited radial movement is accomplished by deflection of said armature segments and said slotted portions.

3. The device claimed in claim 1 wherein said armature segments are loosely retained in slotted portions of said first torque transmitting member and are biased away from said second torque transmitting member by resilient means.

4. The device claimed in claim 1 wherein said electromagnetic coil means include:
a magnet body;
an electromagnetic coil contained within said magnet body; and
said first and second torque transmitting members are freely rotatable about said magnet body and said magnet body is axially and rotationally fixed.

5. The device claimed in claim 1 wherein said second torque transmitting member and said means for generating an electromagnetic flux are rotationally independent.

6. An electromagnetic clutch comprising:
a magnet body including electromagnetic coil means;
a first torque transmitting member co-axial with and rotatable about said magnet body and a second torque transmitting member;
said second torque transmitting member having a generally-cylindrical inner surface with a plurality of circumferentially-spaced, axially-extending, radially-movable electromagnetically insulated armature members;
resilient means operative to bias said armature members toward their radially-outermost position;
said first torque transmitting member having an outer surface adapted for frictional engagement with said armature members when said armature members are in their radially-innermost position; and
said electromagnetic coil means are operative to draw said armature members in their radially-innermost position.

References Cited
UNITED STATES PATENTS

| | | |
|---|---|---|
| 554,766 | 2/1896 | Briggs et al. |
| 1,056,545 | 3/1913 | Huebner. |
| 1,077,805 | 11/1913 | Collier. |
| 3,129,798 | 4/1964 | Rabinow. |
| 3,184,024 | 5/1965 | Aschauer. |

MARK M. NEWMAN, Primary Examiner

A. D. HERRMANN, Assistant Examiner

U.S. Cl. X.R.

192—104